W. McCONWAY, Jr., AND W. KELSO.
TRANSITION CAR COUPLING.
APPLICATION FILED APR. 11, 1918.
1,309,293.
Patented July 8, 1919.
2 SHEETS—SHEET 1.
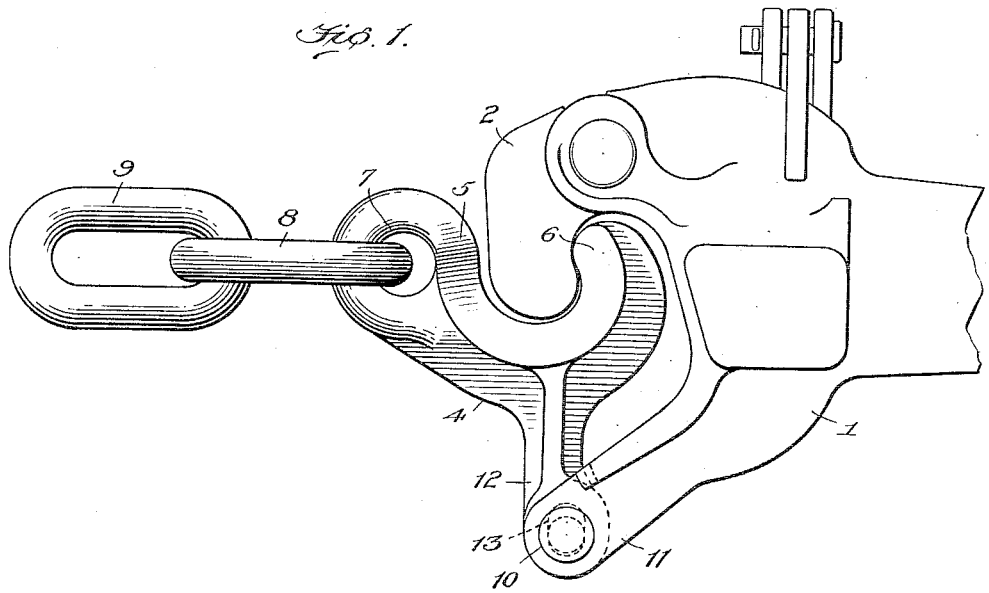
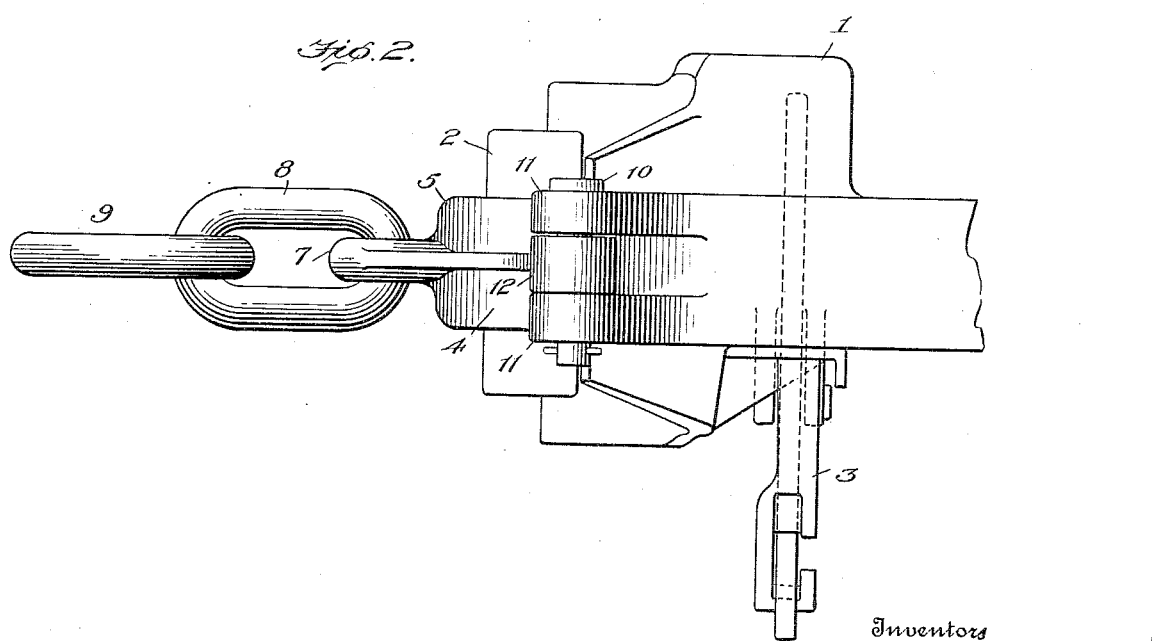
Witness
Edwin L. Bradford
Inventors
William McConway Jr
William Kelso
By Ritter & Ritter
their Attorneys

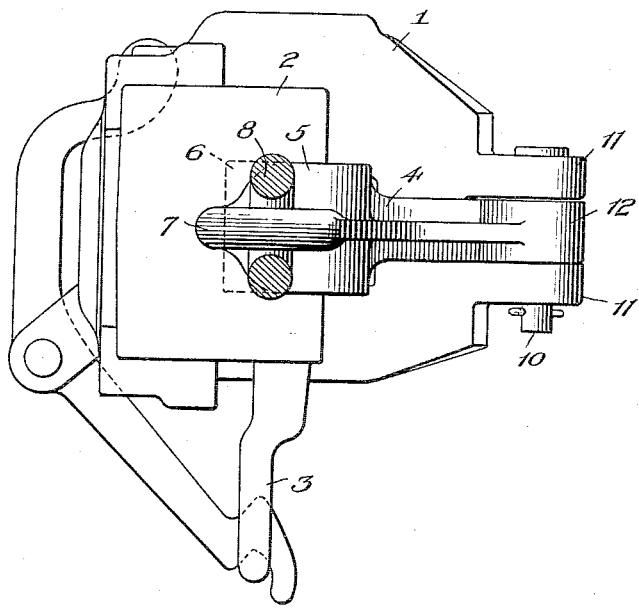
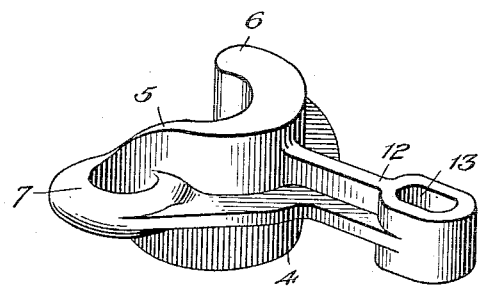

UNITED STATES PATENT OFFICE.

WILLIAM McCONWAY, JR., AND WILLIAM KELSO, OF PITTSBURGH, PENNSYLVANIA, ASSIGNORS TO THE McCONWAY & TORLEY COMPANY, OF PITTSBURGH, PENNSYLVANIA, A CORPORATION OF PENNSYLVANIA.

TRANSITION CAR-COUPLING.

1,309,293.                    Specification of Letters Patent.           Patented July 8, 1919.

Application filed April 11, 1918. Serial No. 227,838.

*To all whom it may concern:*

Be it known that we, WILLIAM McCONWAY, Jr., and WILLIAM KELSO, citizens of the United States, residing at Pittsburgh, in the county of Allegheny and State of Pennsylvania, have invented certain new and useful Improvements in Transition Car-Couplings; and we do hereby declare the following to be a full, clear, and exact description of the invention, such as will enable others skilled in the art to which it appertains to make and use the same.

Our invention relates to the construction of transition car couplings for use on cars during the period of transition incident to the gradual substitution of car couplers of the Master Car Builders' type for couplings of the European hook and link type. The principal object of the invention is to provide a simple, efficient and easily manipulated transition coupling by means of which a car equipped therewith may be readily coupled to another car, whether the latter be provided with a coupling of the hook type, or of the Master Car Builders' type, or with another transition coupling of similar design. Another object of the invention is to produce a transition car coupling providing for a central pull horizontally and vertically regardless of whether the outer end of the knuckle employed be of the slotted or solid type. A further object of the invention is to produce a transition coupling in which the auxiliary coupling device is so combined with the elements of the M. C. B. mechanism that the operativeness of the elements constituting the M. C. B. coupler is not affected when the auxiliary coupling device is detached and dispensed with.

Stated generally, these several objects are accomplished in a transition coupling involving a car coupler of the M. C. B. type combined with an auxiliary coupling device that is movably mounted on the guard-arm side of the coupler head by a pin and slot connection and is adapted to be locked in coupling position by means of the coupler knuckle, the auxiliary coupling device including a member provided with jaws embracing the outer end of the knuckle and bearing in advance of the knuckle a movable link device adapted to engage and be connected to a hook coupling of the European type.

In the drawings illustrating the preferred embodiment of our invention,

Figure 1 is a plan view of a transition car coupling embodying the invention.

Fig. 2 is a side elevation of the construction shown in Fig. 1.

Fig. 3 is a front view of the mechanism, one of the link members being shown in cross-section.

Fig. 4 is a perspective detail view of the jaw member of the auxiliary coupling device.

The transition car coupling embraces in its construction the elements of a car coupler of the M. C. B. type. Such a coupler primarily involves a coupler head 1, a knuckle 2 pivotally mounted thereon and a lock 3 serving to lock the knuckle in closed or coupled position. The drawings illustrate a well known form of M. C. B. coupler; but it will be understood from the scope of the claims defining our invention that the particular details of construction of the M. C. B. coupler are immaterial unless specifically recited in combinations claimed.

Movably mounted upon the guard-arm side of the coupler head 1 so as to be capable of swinging in a horizontal plane is an auxiliary coupling device involving a coupling member 4 having a front jaw 5 and a rear jaw 6, forming a recess into which the outer end of the knuckle 2 is adapted to extend. The forward jaw 5 is provided with an eye 7 constituting means for attaching a link device thereto in advance of the knuckle 2. This link device preferably comprises two links, 8 and 9 respectively, the former passing through the opening in the eye 7, which is enlarged sufficiently to allow the link to turn freely therein both vertically and horizontally, and the latter being adapted to fit over the hook (not shown) of a coupling of the European type. This form of link connection permits the coupled cars to approach and recede from each other as the car buffers reciprocate when the cars are in motion.

When not in use the links 8 and 9 hang vertically from the coupling member 4, which is movably mounted on the coupler head 1 by means of a pivot pin 10 that passes through a pair of pivot lugs 11 extending forwardly and outwardly from the guard-arm of the coupler head 1, the coupling member 4 being formed with an arm 12 adapted to fit between the pivot lugs 11 and having an opening 13 therein for accommodating the pivot pin. The opening 13 is, as shown, preferably elongated to form a slot, thereby providing for desirable sliding movement of the coupling member 4 at this point as it swings when the knuckle 2 closes upon it or when the knuckle opens outwardly to release it. When in use the auxiliary coupling device is locked in coupled position by the coupler knuckle 2, which is itself prevented from rotating by being locked by the lock 3. When not in use the auxiliary coupling device may be swung around to one side where it will be out of the way and not interfere with the M. C. B. coupler. By mounting the auxiliary coupling device upon the coupler head through a pin and slot connection the clearance between the knuckle 2 and the jaws 5 and 6 of the auxiliary coupling device for allowing interlocking and disengaging movements of these parts is reduced, thereby enabling the strength and durability of the eye portion 7 of the auxiliary coupling device to be increased without undue extension of the eye 7 in advance of the knuckle 2.

Our invention is adapted for use with either slotted or solid knuckles and provides for a central pull horizontally and vertically regardless of the type of knuckle employed.

We claim:

1. In a transition coupling, the combination with a car coupler having a coupler head, a knuckle pivotally mounted on said head and a lock for said knuckle, of an auxiliary coupling device movably mounted on the guard-arm side of said head and adapted to be retained in coupling position by said knuckle, said auxiliary coupling device being provided with means whereby it may be connected to a hook coupling of the European type, and said coupler head and auxiliary coupling device having a pin and slot connection permitting said auxiliary coupling member to slide as well as rotate with respect to said head when the knuckle closes in locking the auxiliary coupling device in coupling position or opens to release said auxiliary coupling device.

2. In a transition car coupling, the combination with a car coupler having a coupler head, a knuckle and a lock for said knuckle, of an auxiliary coupling device adapted to be maintained in coupling position by said knuckle, said auxiliary coupling device involving a coupling member provided with jaws adapted to embrace the outer end of said knuckle and a link device movably attached to said jaw member in advance of said knuckle and adapted to be connected to a hook coupling of the European type, said link device involving connected links disposed in planes at right angles to each other, and one of said links being movably connected to said jaw member and having its sides in vertical alinement.

3. In a transition car coupling, the combination with a car coupler having a coupler head, a knuckle and a lock for said knuckle, of an auxiliary coupling device movably mounted on the coupler head and adapted to be maintained in coupling position by said knuckle, said coupling device involving a coupling member provided with jaws adapted to embrace the outer end of said knuckle and a plurality of connected links movably connected to said jaw member in advance of said knuckle.

4. As an article of manufacture, an auxiliary coupling member having jaws adapted to embrace the outer end of a coupler knuckle and having its forward jaw formed with an eye constituting means for attaching a link to said forward jaw and having an arm affording means whereby said auxiliary coupling member may be attached to the head of a car coupler, said forward jaw in advance of said eye being concentric with said eye and being of curved cross-section in radial planes intersecting within said eye.

In testimony whereof we affix our signatures.

WILLIAM McCONWAY, Jr.
WILLIAM KELSO.

Copies of this patent may be obtained for five cents each, by addressing the "Commissioner of Patents, Washington, D. C."